United States Patent
Gu et al.

(10) Patent No.: US 11,231,760 B1
(45) Date of Patent: Jan. 25, 2022

(54) TECHNIQUES FOR ACCURATELY DETERMINING THE TEMPERATURE AT VARIOUS LOCATIONS OF AN OPERATING INTEGRATED CIRCUIT

(71) Applicant: NVIDIA Corporation, Santa Clara, CA (US)

(72) Inventors: Jun Gu, San Jose, CA (US); Tao Li, San Jose, CA (US); Chad Plummer, Bend, OR (US); Brian Lawrence Smith, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/934,395

(22) Filed: Jul. 21, 2020

(51) Int. Cl.
  *G06F 1/20* (2006.01)
(52) U.S. Cl.
  CPC .................. *G06F 1/206* (2013.01)
(58) Field of Classification Search
  CPC ... G06F 1/206; G06F 1/26; G06F 1/32; G06F 1/3243
  USPC .......................... 700/300; 713/320
  See application file for complete search history.

(56) References Cited

U.S. PATENT DOCUMENTS

| | | | |
|---|---|---|---|
| 7,587,262 B1* | 9/2009 | Pippin | G06F 1/324 700/299 |
| 10,001,800 B1* | 6/2018 | Takayanagi | G06F 1/3243 |
| 10,309,838 B2* | 6/2019 | Merrikh | G06F 1/206 |
| 2007/0191993 A1* | 8/2007 | Wyatt | G06F 11/3034 700/299 |
| 2015/0012115 A1* | 1/2015 | Panvelwala | G05D 23/1932 700/7 |
| 2018/0073933 A1* | 3/2018 | Keskin | G05D 23/1917 |

* cited by examiner

*Primary Examiner* — Chun Cao
(74) *Attorney, Agent, or Firm* — Shook, Hardy & Bacon L.L.P.

(57) ABSTRACT

Integrated circuits (ICs)—depending on a current workload—may exceed thermal cooling budgets. As a result, ICs often implement thermal sensors to measure temperatures at junctions or hot spots along the IC. Due to a distance between the thermal sensors and the various junctions, a thermal offset may be added to the temperature readings from the thermal sensors to more accurately estimate the temperature at the junctions. To account for different workload distributions—e.g., asymmetric or symmetric—the systems and methods described herein may dynamically adjust the thermal offsets. As a result, the efficiency of the IC may be increased as thermal settings for the IC may take into account the ability of the thermal cooling budget to effectively cool the IC under a current operating condition—thereby reducing premature throttling back or shutting down of power to the IC.

20 Claims, 6 Drawing Sheets

TECHNIQUES FOR ACCURATELY DETERMINING THE TEMPERATURE AT VARIOUS LOCATIONS OF AN OPERATING INTEGRATED CIRCUIT

BACKGROUND

Integrated circuits (ICs), or chips, are consistently becoming denser with transistors and other components to increase power density—e.g., power per unit volume—while decreasing the footprint of the IC within a larger system. However, as the ICs become denser, the demand for power increases and is also focused on smaller regions of the IC than in previous generations. This increase in power over a smaller portion of an IC generates more heat more quickly—thereby requiring a greater capacity for cooling the IC in order to enable the IC to work efficiently over time. In order to manage the heat generation and dissipation in an IC, thermal sensors may be spread across an IC to measure temperatures of various locations or portions of the IC. Due to the floorplan, routing, and/or congestion on the IC, these thermal sensors may be placed some distance away from actual hotspots of the IC, thus requiring a thermal offset—e.g., an increased temperature value—be added to the readings of the sensors to more accurately reflect the temperature at the hotspots. The final temperature value—e.g., the thermal sensor reading plus the thermal offset—may be used to determine when to throttle back power to the IC and/or to shut down power to the IC to avoid damage, crash, or improper operation.

However, because the offset values are set during secure boot—due to the decreased security of software after secure boot—the thermal offsets are margined for worst case workloads or temperature distributions on the IC. As a result, even where a temperature distribution is more symmetrically distributed across the IC and within a cooling budget of the IC, due to the offset being tuned for worst case scenarios, power to the IC may be throttled back or shut down prematurely. For example, when a final temperature value for a single thermal sensor exceeds a threshold, the IC may be throttled back or shut down even where the temperature, power, voltage, and/or frequency associated with the IC are within a cooling budget of the IC. This premature throttling back or shutting down of power to the IC in instances where the IC is capable of performing effectively may cause reductions in the overall performance of the IC—thereby reducing the compute resources available to the system. In addition, by not using conservative enough offsets and/or not throttling back when needed, local overheating of the IC may occur, leading to reduced reliability of the IC.

SUMMARY

Embodiments of the present disclosure relate to monitoring temperature distributions in computer hardware to adjust thermal settings (e.g., thermal offsets values) for increasing the efficiency of the computer hardware. Systems and methods are disclosed that enable adjustments to thermal offsets based on determined temperature or workload distributions—e.g., symmetric or asymmetric—across an integrated circuit (IC). For example, a thermal solution (e.g., a heat sink, a fan, fin pins, liquid cooling, air cooling, etc.) for an IC may be capable of sufficiently cooling the IC when operating at maximum power with a substantially symmetric temperature distribution. However, where maximum power is supplied over an asymmetric temperature distribution or workload, the thermal solution may not be capable of sufficiently cooling the IC.

Techniques of the present disclosure enable the system to identify asymmetric and symmetric temperature distributions in order to adjust thermal offsets of the IC—thereby allowing varying temperature offsets corresponding to power adjustments (e.g., throttle back power, turn off power, etc.) of the IC under different operating conditions. As such, when a symmetric distribution is detected, the thermal offsets may be decreased to account for the ability of the thermal solution to better cool the IC, while the thermal offsets may be increased for asymmetric distributions to account for a potential inability of the thermal solution to cool the IC—or at least the portion of the IC corresponding to the asymmetric temperature distribution or workload. By doing so, the IC may operate more efficiently and effectively during symmetric distributions (e.g., by not having power throttled back prematurely) while still allowing the system to make adjustments to power when necessary (e.g., when an amount of power for a portion of the IC may push the temperature beyond cooling limits of the thermal solution).

BRIEF DESCRIPTION OF THE DRAWINGS

The present systems and methods for monitoring temperature distributions in computer hardware to adjust thermal settings (e.g., thermal offsets values) for increasing the efficiency thereof are described in detail below with reference to the attached drawing figures, wherein.

DETAILED DESCRIPTION

Systems and methods are disclosed related to monitoring temperature distributions in integrated circuits (ICs) or chips to adjust thermal settings (e.g., thermal offsets values) for increasing the efficiency of the IC. Although an example is described herein with respect to a system on a chip (SoC), this is not intended to be limiting. The systems and methods described herein may be implemented for any type of IC where thermal sensors may be implemented—such as, but not limited to, graphics processing units (GPUs), central processing units (CPUs), sound chips, network interface chips, memory ICs (e.g., random access memory (RAM), static RAM (SRAM), read-only memory (ROM), etc.), an SoC, monolithic ICs, hybrid ICs, multi-chip ICs, digital ICs, analog ICs, mixed signal ICs, thin ICs, thick ICs, logic ICs, audio amplifiers, operational amplifiers, timer ICs, power management ICs, interface ICs, and/or other IC types. Although described with respect to ICs or chips, the thermal management techniques described herein may be implemented on hardware components other than ICs or chips without departing from the scope of the present disclosure.

In addition, the thermal management for ICs described herein may be implemented within any type of system, such as, without limitation, autonomous, semi-autonomous, and/or non-autonomous vehicle systems (e.g., in increasing efficiency of the underlying SoC(s)), cloud and data center systems (e.g., for CPUs, GPUs, etc.), robotics systems, gaming systems (e.g., virtual reality, platform gaming, cloud gaming, etc.), entertainment systems, general computing systems, high performance computing (HPC) systems, graphics rendering systems (e.g., for ray tracing, stereoscopic three-dimensional (3D) rendering, etc.), medical imaging and analysis systems (e.g., for healthcare, life sciences, etc.), machine learning and/or artificial intelligence systems, industrial automation systems, parallel computing platforms, mobile computing systems, internet of things (IoT) systems, edge computing applications, and/or other system or application types. As such, the systems and methods described herein may be implemented for any IC—or combination thereof—for improving the thermal management of the IC to increase the efficiency and effectiveness thereof.

Figure 1:
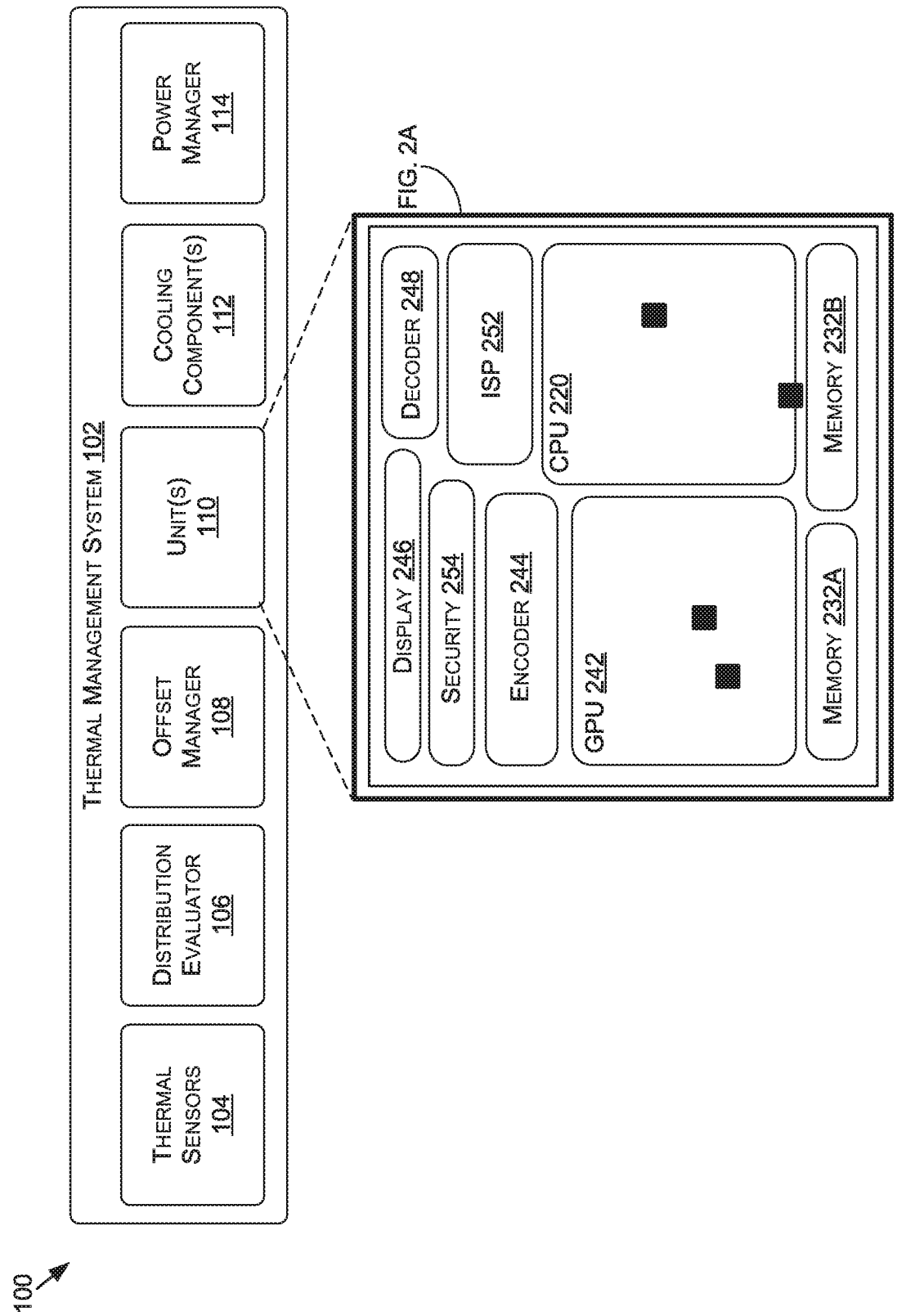
FIG. 1 depicts a block diagram of a thermal management system, in accordance with some embodiments of the present disclosure.

With reference to FIG. 1, FIG. 1 is an example block diagram for a thermal management system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, components, features, and/or functionality of the system 100 may be similar to that of example computing device 500 of FIG. 5, and/or the system 100 may include additional or alternative components, features, and/or functionality to that of the example computing device 500 of FIG. 5.

The system 100 may include, at least in part, thermal sensors 104, a distribution evaluator 106, an offset manager 108, a unit(s) 110, a cooling component(s) 112, and a power manager 114. The system 100 may include any number of thermal sensors 104 that may be configured to generate outputs indicative of a detected temperature of a unit(s) 110 of an IC at a location of the thermal sensor 104. The thermal sensors 104 may include, without limitation, diodes, bipolar junction transistors (BJTs), voltage output IC sensors, current output IC sensors, digital output IC sensors, immersion IC sensors, transducer type IC sensors, thermocouple sensors, thermistor sensors, resistance temperature detector (RTD) sensors, and/or another type of temperature sensor suitable for implementation on the IC or a unit(s) 110 thereof. As such, the thermal sensors 104 may generate an output signal(s) (e.g., corresponding to a voltage, a current, a resistance, etc.) that may be indicative of a corresponding temperature of the unit(s) 110 or the IC at the location of the thermal sensor 104. The thermal sensors 104 may be disposed at any location on an IC, such as on a front and/or back of an IC (e.g., the front and/or back of SoC 110A of FIG. 2A).

Figure 2A:
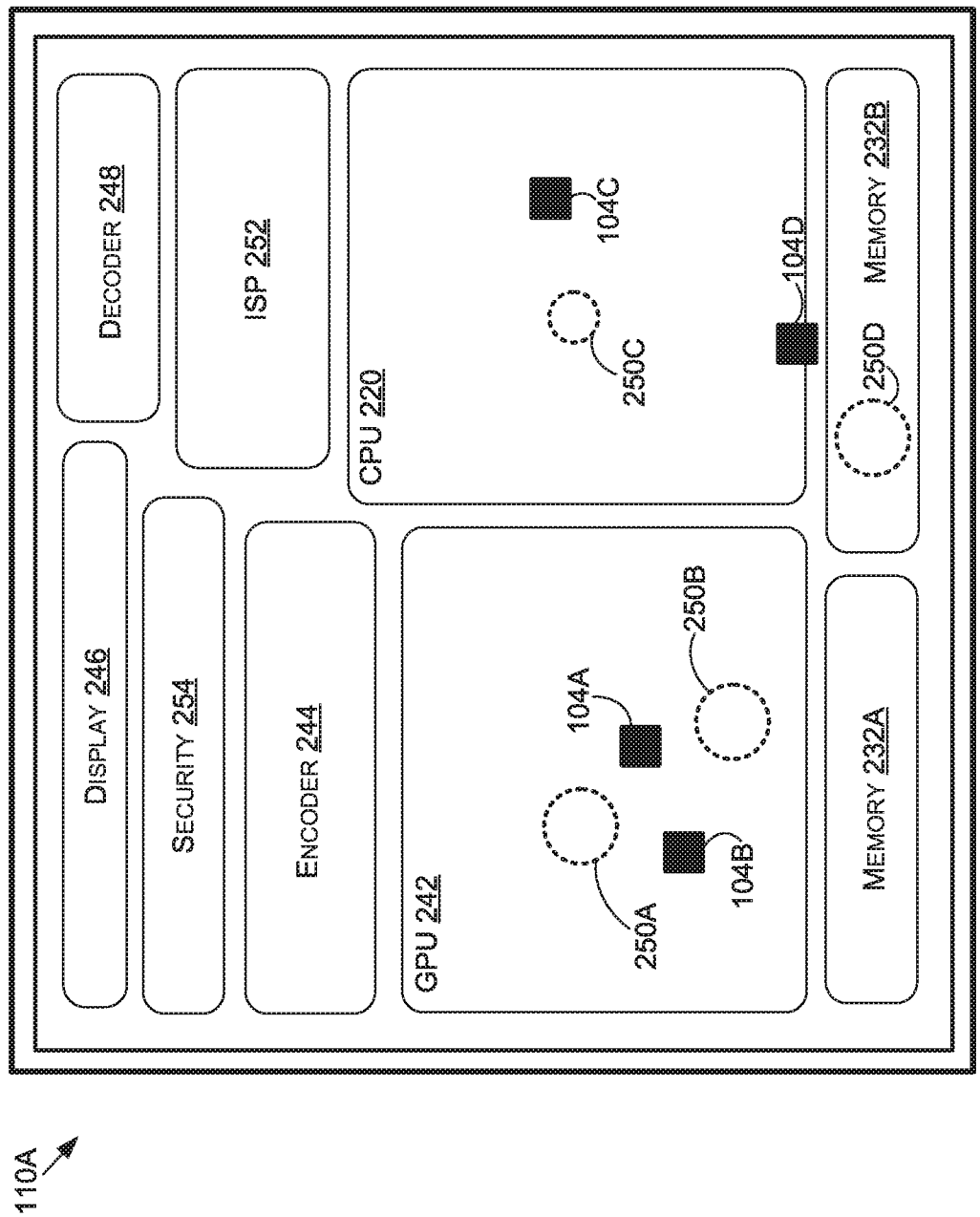
FIG. 2A depicts an example illustration of a system on a chip (SoC), in accordance with some embodiments of the present disclosure.

With reference to FIG. 2A, an IC may correspond to a SoC 110A. For example, the SoC 110A may include any number of electrical components, circuitry, logic, and/or other hardware—such as transistors, diodes, capacitors, resistors, etc.—that corresponds to units 110 thereof, such as a GPU(s) 242 (e.g., with any number of CUDA cores), a CPU(s) 220 (e.g., an advanced RISC machine (ARM) processor(s)), an image signal processor (ISP) 252, a camera serial interface (CSI), a deep learning accelerator (DLA), a programmable vision accelerator (PVA), other accelerator types, a video processor, memory 232A and 232B (e.g., low-power double data rate (LPDDR) memory, such as synchronous dynamic random access memory (SDRAM)), network interface modules (e.g., for Wi-Fi, Ethernet, USB, HDMI, etc.), coprocessors, an encoder 244, a decoder 248, a display component(s) 246, a security component(s) 254 (e.g., a security engine, a hardware security module (HSM), etc., such as for executing secure boot software, firmware, etc.), and/or other components, units 110, or hardware types to support various functionality of the SoC 110A. The illustration of the SoC 110A is for example and clarity purposes only. For example, each of the labeled components may consist of any number of sub-components, circuitry, logic, and/or the like.

The SoC 110A may include any number of thermal sensors 104, including the thermal sensors 104A-104D. For example, although only four thermal sensors are illustrated, there may be five, ten, twenty, fifty, or more thermal sensors 104 on an IC—and/or a unit(s) 110 thereof—depending on the embodiment. The thermal sensors 104 may measure temperatures of the SoC 110A generally, and/or may be associated with measuring temperatures of individual components or groups of components of the SoC 110A. For example, the thermal sensor 104D may measure temperatures corresponding to the memory 232 (e.g., the memory 232A-232B), and may be referred to as a memory thermal sensor 104D. The thermal sensors 104A and 104B may measure temperatures corresponding to the GPU 242, and may be referred to as GPU thermal sensors 104A-104B. The thermal sensor 104C may measure temperatures corresponding to the CPU 220, and may be referred to as a CPU thermal sensor 104C. As described herein, when determining an average temperature of the SoC 110A, the average temperature may thus correspond to the entire SoC 110A, or may correspond to sub-sets of the SOC 110A. For example, the thermal offsets may be managed separately for the memory thermal sensors 104D (which may include any number of sensors), separately for the GPU thermal sensors 104A-104B (which may include any number of sensors), and/or separately for the CPU thermal sensors 104C (which may include any number of sensors). In other embodiments, the thermal offsets may be managed separately for groups of thermal sensors that are related not based on their relation to a particular component or functionality of the IC (e.g., the thermal sensor 104C and 104D may be analyzed together due to their proximity). Similarly, the cooling component(s) 112 may be separately controlled according to the different temperature sensor types, or may be generally controlled using any of the temperature sensors or combinations thereof. For a non-limiting example, where two or more fans 260A and 260B (FIG. 2B) are used to cool an entire package including the SoC 110A, the fan 260A may be controlled based on temperature readings from the GPU thermal sensors 104 and the fan 260A may be controlled based on temperature readings from the CPU thermal sensors 104, and so on.

The distribution evaluator 106 may determine a type of temperature or workload distribution currently being executed by the unit(s) 110 of an IC(s). For example, the distribution evaluator 106 may determine whether the temperature distribution is asymmetric or symmetric based on temperature readings from the thermal sensors 104 (e.g., with respect to FIG. 2A, temperature readings from the GPU thermals sensors 104A-104B, temperature readings from the memory thermal sensors 104D, temperature readings from the CPU thermal sensors 104C, or a combination thereof).

In addition to, or alternatively from, determining the temperature or workload distribution using the thermal sensors 104, various other inputs may be generated and analyzed to determine the distributions. For example, unit activity of units 110 of the IC(s) may be computed or determined, such as by monitoring the current workloads of a unit(s) 110—or portion thereof—or tasks being executed by the unit(s) 110. As another example, utilization of one or more of the units 110 may be monitored and used to determine the workload distribution of the unit(s) 110 of the IC(s). For example, a unit(s) 110 or portion thereof may be capable of performing a certain amount of work or processing, and the current amount of work or processing may be compared against a capability of the unit(s) 110 to determine the utilization thereof. As another example, rail power consumption of the unit(s) 110 of the IC(s) may be monitored to determine the workload and/or temperature distributions across the unit(s) 110 and/or the IC(s). In some examples, memory traffic may be monitored to determine a distribution across the unit(s) 110 and/or the IC(s). As such, one or more of a variety of different factors or criteria may be monitored to determine the temperature and/or workload distribution of the unit(s) 110 and/or the IC(s).

In order to determine an asymmetric or symmetric temperature distribution or workload, as an example, a difference in temperature, $D_{temp}$, may be computed, where $D_{temp}$ may correspond to a difference in temperature between a thermal sensor 104 with a highest temperature reading and an average temperature reading of thermal sensors 104 of the unit(s) 110 of the IC. This computed value, $D_{temp}$ may be compared against a threshold value, $D_{threshold}$, and where $D_{temp}$ is greater than $D_{threshold}$, the distribution evaluator 106 may determine that the current temperature or workload distribution is asymmetric. Similarly, where the value of $D_{temp}$, is less than $D_{threshold}$, the distribution evaluator 106 may determine that the current temperature or workload distribution is symmetric.

In some embodiments, the temperature readings from the thermal sensors 104 that are used for computing temperature distributions may correspond to actual temperature readings from the thermal sensors 104 and/or may correspond to the actual temperature readings plus a thermal offset value. For example, for computing $D_{temp}$, the temperature readings used may be the actual temperature readings which may then be used to determine the offset value—as described in more detail herein. As another example, for computing $D_{temp}$, the temperature readings used may be the actual temperature plus an offset value (e.g., a current offset value, an offset value corresponding to symmetric workloads, an offset value corresponding to asymmetric workloads, etc.).

As an example, and with respect to FIG. 2A, the distribution evaluator 106 may analyze the temperature readings from each of the thermal sensors 104A-104D of the SoC 110A to determine an average temperature. The distribution evaluator 106 may then look at each individual temperature reading from each thermal sensor 104A-104D to compute $D_{temp}$, and may then compare $D_{temp}$ to $D_{threshold}$ to determine whether the temperature distribution across the SoC 110A is symmetric or asymmetric. As another example, such as where temperature or workload distributions are computed for sub-components of the SoC, the distribution evaluator 106 may analyze the temperature readings from each of the GPU thermal sensors 104A-104B of the GPU 242 to determine an average temperature. The distribution evaluator 106 may then look each individual temperature reading from each GPU thermal sensor 104A-104B to compute $D_{temp}$, and may then compare $D_{temp}$ to $D_{threshold}$ to determine whether the temperature distribution across the GPU 242 is symmetric or asymmetric. As a non-limiting example, where the average temperature of the GPU 242 is 50 degrees C., the thermal sensor 104A has a value of 70 degrees C., and $D_{threshold}$ is 15 degrees C., the temperature distribution of the GPU 242 may be considered asymmetric (e.g., because $D_{temp}$ is 20 degrees C.). As another example, where the average temperate of the GPU 242 is 80 degrees C., the thermal sensor 104A has a value of 70 degrees C., the thermal sensor 104B has a value of 90 degrees C., and $D_{threshold}$ is 15 degrees C., the temperature distribution of the GPU 242 may be considered symmetric (e.g., because $D_{temp}$ is 10 degrees C. for both the thermal sensors 104A and 104B).

Although the above example primarily uses temperature readings from the thermal sensors 104 to determine the distributions, this is not intended to be limiting. For example, as described herein, various factors or criteria—in addition to or alternatively from temperature—may be used to determine the distributions across the unit(s) 110 of the IC(s). As such, one or more of temperature, unit activity, utilization, rail power consumption, memory traffic, and/or other criteria may be used to calculate $D_{temp}$ (or $D_{weighted}$) as a weighted calculation. In order to determine an asymmetric or symmetric distribution or workload, as an example, a difference in $D_{weighted}$ may be computed, where $D_{weighted}$ may correspond to a difference in the weighted calculation of the various criteria between a unit(s) 110 or portion thereof with a highest weighted value and an average weighted value of the various criteria of the unit(s) 110 of the IC(s), or portions thereof. This computed value, $D_{weighted}$, may be compared against a threshold value, $D_{threshold\_weighted}$, and where $D_{weighted}$ is greater than $D_{threshold\_weighted}$, the distribution evaluator 106 may determine that the current temperature or workload distribution is asymmetric. Similarly, where the value of $D_{weighted}$ is less than $D_{threshold\_weighted}$, the distribution evaluator 106 may determine that the current temperature or workload distribution is symmetric.

In some embodiments, to calculate $D_{temp}$ or $D_{weighted}$, the distribution evaluator 106 may be trained by mapping various criteria—e.g., temperature, unit activity, rail power consumption, and/or other criteria—with infrared imaging (e.g., an actual temperature profile of the unit(s) 110 of the IC(s), and/or the IC(s) as a whole) and/or a simulated thermal map using a thermal simulator. As such, certain combinations of values may be learned to correspond to certain $D_{temp}$ and/or $D_{weighted}$ values, and these learned values may be used for calculating these values during use of the IC(s).

In some other examples, such as where any single criteria is used, the value of the single criteria (e.g., $D_{temp}$ where temperature is the single criteria) may be compared against a threshold for that criteria. As such, unit activity, utilization, rail power consumption, etc. may be used individually in lieu of temperature, in some embodiments.

The offset manager 108 may leverage the information from the distribution evaluator 106 to adjust the thermal offsets for one or more of the thermal sensors 104 of the unit(s) 110 of the IC. The thermal offset value may correspond to some number of degrees of temperature (e.g., Fahrenheit, Celsius, and/or another type of temperature measurement) that may be added to the actual temperature reading of a thermal sensor 104 to account for a physical—e.g., distance—offset between the thermal sensor 104 and a location (or junction) on the unit(s) 110 of the IC where a temperature reading is desired (e.g., a junction temperature, $T_j$). As described herein, the thermal sensors 104 may not be positioned directly on or near the desired locations as a result of a floorplan of the IC, congestion of components at a desired location on the IC (e.g., such that there is not enough space for thermal sensor 104), and/or routing issues (e.g., a communication or power path for the thermal sensor 104 may not be available, or a communication or power path, if created, would interfere with communication or power to another component).

In some embodiments, the location may correspond to identified hot spots corresponding to one or more units 110 of the IC. For example, with respect to FIG. 2A, hot spots 250A-250D may be determined on the SoC 110A. The hot spots 250 may correspond to known locations on the SoC 110A (or individually on subcomponents or units of the SoC 110A, such as the GPU 242), where temperatures are known to reach high levels under certain operating conditions. For example, to determine the hot spots 250, thermal simulations of a virtual representation of the IC (e.g., prior to manufacture) or thermal observations of the IC (e.g., after manufacture) may be executed. In addition to determining the hot spots 250 using these testing techniques, the offset values may also be determined using thermal simulation and/or thermal observation (e.g., using infrared cameras to look at hot spots in comparison to thermal sensor 104 locations). As a non-limiting example, multiply accumulators (MACs) of a GPU 242 may burn a lot of energy, and thus produce a lot of heat, thereby generating hot spots 250 corresponding to the GPU 242. As such, the thermal offset values may be determined in order to estimate a final temperature value for locations on the unit(s) 110 of the IC that may be some physical distance away from the thermal sensors 104.

In some embodiments, the thermal offsets and/or hot spot locations may be determined for a particular use case. For example, where an IC is to be used for a particular task(s) and/or within a particular system, the IC may be tested—e.g. using thermal observation—while operating under likely conditions for the IC. As a result, the hot spot locations and/or thermal offsets (e.g., for symmetric and/or asymmetric offsets) may be tuned to a particular workload—e.g., of a particular customer.

The offset manager 108 may determine which thermal offset value should be added to the actual temperature reading of the thermal sensors 104 based on the temperature, power, and/or workload distribution of determined by the distribution evaluator 106. In some embodiments, thermal offsets may be applied globally based on a determination of an asymmetric distribution or a symmetric distribution. For example, and with respect to FIG. 2A, where the hot spots 250A and 250B of the GPU 242 are expected to be found in largely identical units/partitions replicated across the chip, two different offsets may be sufficient—e.g., an asymmetric offset for when a reading(s) from a GPU thermal sensor(s) 104 corresponds to an asymmetric temperature distribution and a symmetric offset for when a reading(s) from a GPU thermal sensor(s) 104 corresponds to a symmetric temperature distribution. As such, when an asymmetric temperature distribution is determined on the GPU 242, the asymmetric offset (which may be greater than the symmetric offset) may be used for each of the GPU thermal sensors 104, and vice versa for a symmetric temperature distribution. The final temperature values computed using the currently implemented offset value may then be compared—by the power manager 114—to various temperature thresholds for throttling back power to the unit(s) 110 of the IC (e.g., the SoC 110A) and/or turning off power to the unit(s) 110 of the IC to avoid damage, crash, and/or improper operation of the unit(s) 110 of the IC. As a result, conservative (e.g., worst case) thermal offsets may only be implemented when the asymmetry is greater than $D_{threshold}$, while enabling lower thermal offsets for more symmetric distributions. For example, the symmetric offset may correspond to a conservative or "worst case" scenario for symmetric distributions—in contrast to conventional systems that implement a conservative or worst case thermal offset value corresponding to asymmetric distributions even where an IC—or a unit(s) 110 thereof—may currently be subject to a symmetric temperature, workload, or power distribution.

In some embodiments, individual thermal sensors 104—or groups of thermal sensors 104—may have different offsets than others. For example, even where a symmetric offset or an asymmetric offset is applied globally, the values for a symmetric and/or asymmetric offset for a first thermal sensor 104 may be different from the values for a symmetric and/or asymmetric offset for a second thermal sensor 104. As such, and with reference to FIG. 2A, the GPU thermal sensor 104A may have a different symmetric and/or asymmetric offset than the GPU thermal sensor 104B. Similarly, the GPU thermal sensors 104A-104B may have different symmetric and/or asymmetric offsets from the memory thermal sensor(s) 104D and/or the CPU thermal sensor(s) 104C.

In some examples, the switch between symmetric and asymmetric offset values may not be universal. For example, different thermal sensors 104 may have their associated offset value switched to an asymmetric offset value while other thermal sensors 104 may maintain a symmetric offset. As a non-limiting example, an offset may be switched from symmetric to asymmetric only for the thermal sensor(s) 104 that satisfies the $D_{threshold}$ condition (e.g., only for the thermal sensors 104 whose computed $D_{temp}$ value is greater than $D_{threshold}$). In some examples, each of the thermal sensors 104 that are within a threshold distance or difference from a local average temperature or a chip average temperature may have their associated thermal offset changed to asymmetric while the other thermal sensors 104 may be left unchanged. In some embodiments, the average temperature for a unit/partition of the IC may be compared to the average temperature of the entire IC to determine the $D_{temp}$ value corresponding to the averages. As such, the average of a plurality of thermal sensors 104 of a unit/partition (e.g., the GPU thermal sensors 104 of the GPU 242) may be compared against the average of each of the thermal sensors 104 of the IC (e.g., each of the thermal sensors of the SoC 110A) to determine the value for $D_{temp}$, and the value for $D_{temp}$ may be compared to the $D_{threshold}$ value(s) for determining whether to adjust the thermal offsets for one or more of the thermal sensors 104 of the unit/partition 110.

As another example, there may be more than one $D_{threshold}$, and different asymmetric offset values may be associated with the different values of $D_{threshold}$ for one or more of the thermal sensors 104. For example, a first asymmetric offset may be set when a first $D_{threshold}$ is reached, then a second (e.g., higher) asymmetric offset may be set when a second (e.g., higher) $D_{threshold}$ is reached.

In some examples, in addition to analyzing temperatures, voltage, power, frequency, and/or combination thereof may be analyzed to determine whether or not the thermal offsets should be adjusted. For example, where temperatures of certain thermal sensors 104 may satisfy $D_{threshold}$, the voltage may be monitored to determine whether the thermal offset value should be adjusted to an asymmetric offset. A low voltage with a higher temperature may not be an issue because the cooling components 112 may be able to sufficiently cool the IC—or unit(s) 110 thereof—at the low voltage even with a higher temperature. In some instances, the offset value may not be adjusted to the asymmetric offset. However, in other instances, the offset value may be adjusted to the asymmetric offset but, since cooling is over-provisioned for the low voltage case, the (higher) asymmetric offset value may still not cause the final temperature to reach the throttling temperature threshold. Conversely, as the voltage increases, the cooling component(s) 112 may not be capable of cooling the IC, so the asymmetric offset may be set in order to avoid damage, overheating, or issues with performance of the IC and/or components or unit(s) 110 thereof. For example, where power is concentrated in half of the IC, thermal offset values may be less than if the voltage is concentrated in a quarter of the IC. As an example, where an IC operates at 1.0 V max, if the current voltage is 0.8 V, the offsets may be changed when the $D_{threshold}$ criteria is satisfied to account for the possibility of the temperature increasing to a value that exceeds the cooling budget of the IC. In some embodiments, a ratio between a current voltage value to the IC and a maximum voltage value corresponding to the IC (or vice versa) may be determined, and this ratio may be compared against a ratio threshold to determine whether a voltage criteria is satisfied and a change to the thermal offset value should be made.

In some embodiments, the corresponding asymmetric offset values and symmetric offset values for portions or units 110 of the IC—or thermal sensors 104 associated therewith—may be programmed based on power density (power per unit volume) and/or voltage to frequency ratios. For example, the voltage to frequency ratio may aid in identifying where maximum power density may be, and a voltage threshold may be used to determine whether or not adjust a thermal offset from a symmetric offset to an asymmetric offset. There may be units/partitions of the IC that need higher voltage to operate a high frequency, while other units/partitions of the IC may require lower voltage to operate a high frequency—as controlled using dynamic frequency voltage scaling (DFVS), for example. This information may be leveraged to determine—in addition to the determination of a symmetric or asymmetric temperature distribution using the thermal sensors 104—whether the offset values should be switched for a particular state of the IC.

To adjust the thermal offset values from one thermal offset value (e.g., corresponding to an asymmetric distribution) to another thermal offset value (e.g., corresponding to a symmetric distribution) may occur incrementally to avoid rapid adjustments and account for noise in the temperature readings. For example, a current offset value may be updated incrementally to a desired offset value at each time step that a relationship is satisfied. In such an example, where the relationship is the $D_{threshold}$ relationship, for each time step where $D_{temp}$ is greater than $D_{threshold}$ the current offset value may be updated one increment (e.g., one degree, two degrees, etc.) until the desired offset is reached. As such, there may be instances where an offset is increased for a series of time steps toward an asymmetric offset value and then decreased for a series of time steps prior to reaching the asymmetric offset value, and vice versa. In some embodiments, the rate at which the offset value is increased may differ for some thermal sensors 104 more than others. For example, based on the thermal modeling or observation, and/or current voltage, frequency, and/or power measures, it may be determined that certain thermal sensors 104 may correspond to hot spots where temperature rises more quickly than others when under certain workloads. In such examples, the increment for those thermal sensors 104 may be greater (e.g., two degree increments as opposed to one degree increments) and/or the evaluation or update frequency may be greater than thermal sensors 104 corresponding to hot spots that are less likely to have rapid temperature changes.

In some embodiments, to avoid tampering and misuse of the ICs 110, the values for $D_{threshold}$, asymmetric offsets, and/or symmetric offsets may be programmed securely and locked down by boot software. As such, during boot, at startup, and/or during initialization, the boot software may set these values and, during operation, secure hardware of the IC may manage subsequent switching between symmetric and asymmetric offsets for the various thermal sensors 104.

Figure 2B:
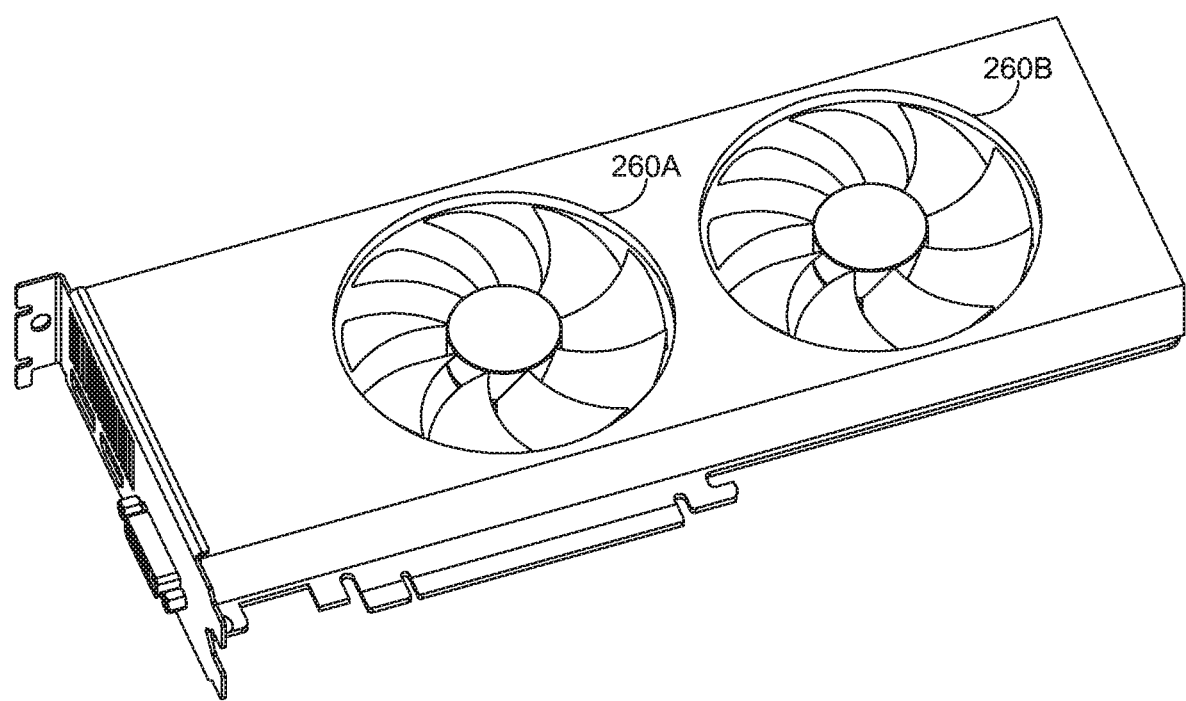
FIGS. 2B-2C depict example illustrations of cooling components associated with a hardware package including an integrated circuit, in accordance with some embodiments of the present disclosure.
Figure 2C:
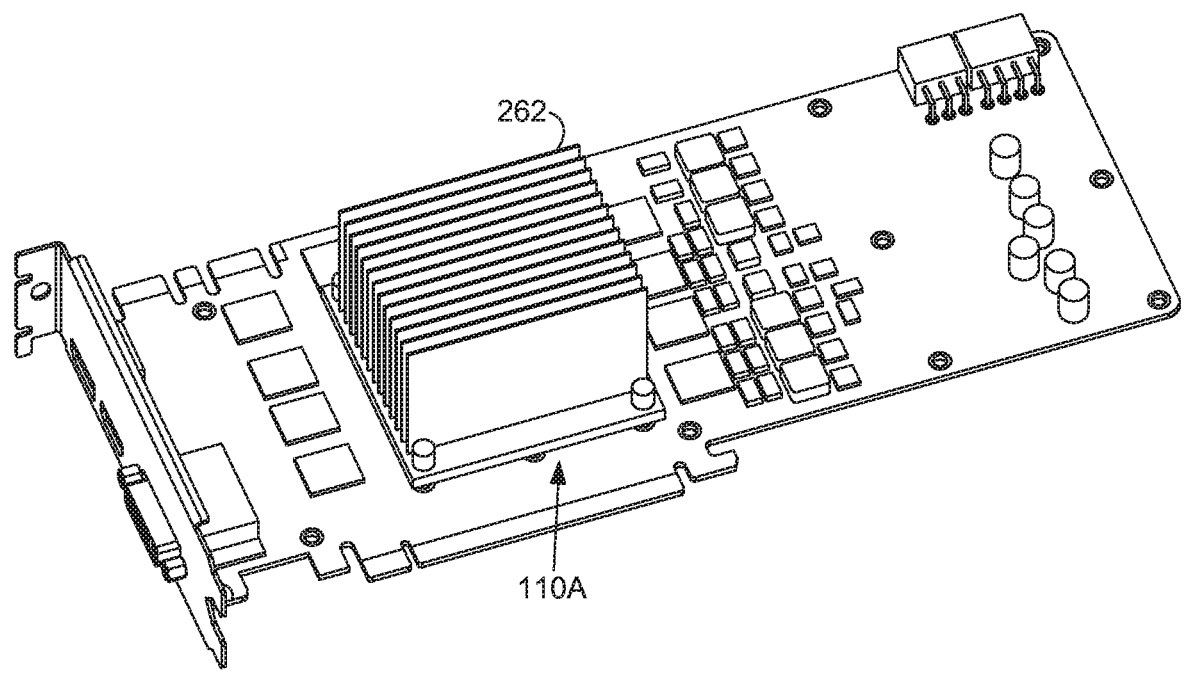

With reference to FIGS. 2B and 2C, the SoC 110 may be implemented on a card or circuit board, and the package including the SoC 110 may implement various cooling component(s) 112—e.g., fans 260A and 260B and/or a heat sink(s) 262. For example, with reference to FIG. 2C, the heat sink 262 may be disposed on the SoC 110A to aid in cooling the SoC 110A. In some embodiments, more than one cooling component(s) 112 may be used for a given IC. For example, a combination of heat sinks, fans, pin fins, liquid, air, and/or other cooling component types may be implemented based on the cooling requirements and/or the implementation location of the IC—or unit(s) 110 thereof. To determine the cooling components 112 that define the thermal cooling budget of an IC, a thermal budget—or thermal design power (TDP)—may be estimated to represent the sustainable power the unit(s) 110 of the IC is expected to be able to dissipate without overheating. This determination may be made based on both symmetric and asymmetric temperature, power, voltage, and/or workload distributions for the IC. As such, at various times, different units 110 and/or partitions of the IC may be burning more power than other portions, but as long as the total power is still below TDP (and heat spreading of the thermal cooling solution is sufficient), the IC may still not overheat. However, even where accounted for, the IC may still exceed the thermal cooling budget in certain platforms—e.g., because even chip power is below TDP heat spreading is not perfect, and may not be sufficient to cool a chip with power concentrated in a smaller portion of the chip. As a result, the dynamic adjustments between thermal offsets may aid in accounting for and managing the capabilities of the thermal cooling budget such that the IC may operate as efficiently and effectively as possible given a current temperature distribution.

Figure 3:
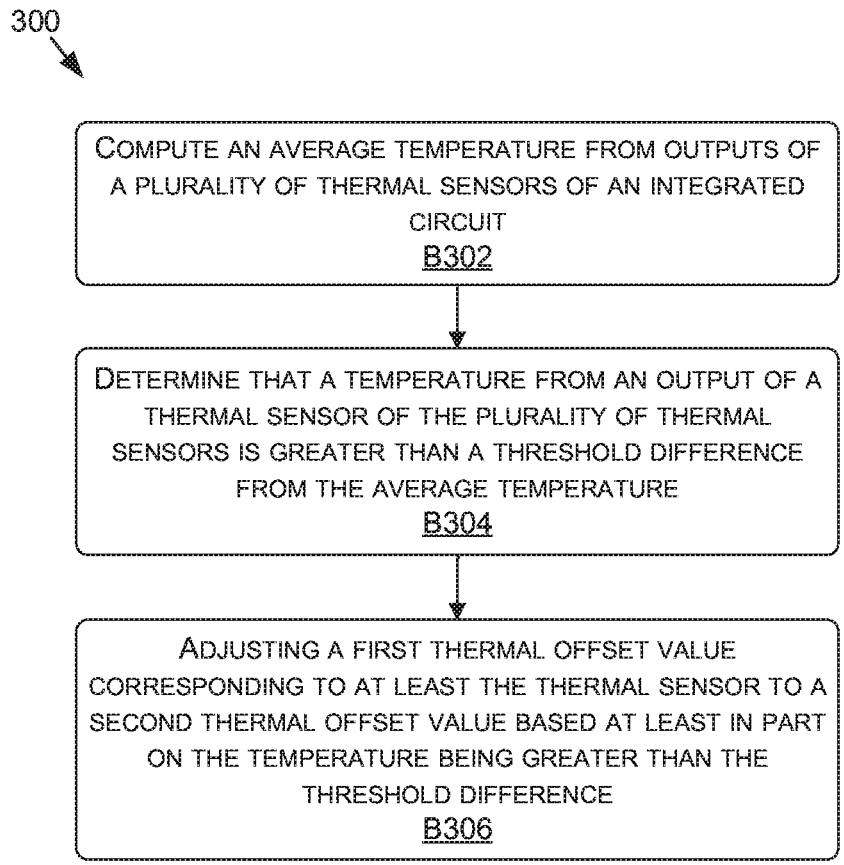
FIGS. 3-4 depict flow diagrams for methods of thermal offset management of integrated circuits, in accordance with some embodiments of the present disclosure.
Figure 4:
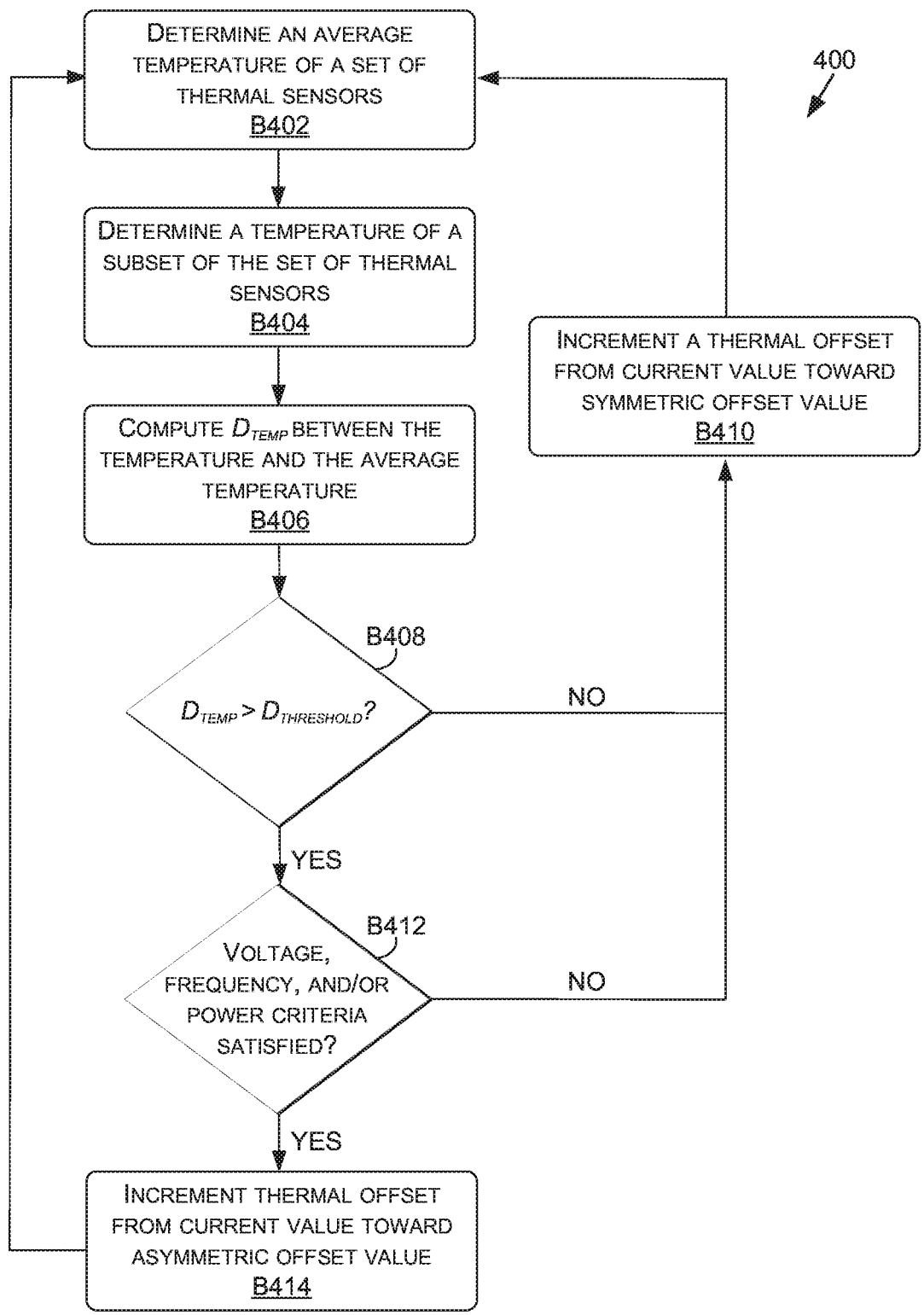

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The method may be provided by a standalone application, a service or hosted service (standalone or in combination with another hosted service), or a plug-in to another product, to name a few. In addition, methods 300 and 400 are described, by way of example, with respect to the system 100 of FIG. 1 and the SOC 110A of FIG. 2A. However, this method may additionally or alternatively be executed by any one system, or any combination of systems, including, but not limited to, those described herein.

With reference to FIG. 3, FIG. 3 is a flow diagram showing a method 300 of thermal offset management of ICs, in accordance with some embodiments of the present disclosure. The method 300, at block B302, includes computing an average temperature from outputs of a plurality of thermal sensors of an integrated circuit. For example, the average temperature of a plurality of thermal sensors 104 of a unit(s) 110 of an IC may be computed.

The method 300, at block B304, includes determining that a temperature from an output of a thermal sensor of the plurality of thermal sensors is greater than a threshold difference from the average temperature. For example, the temperate reading of a thermal sensor 104 may be compared to the average temperature to compute $D_{temp}$, and the value of $D_{temp}$ may be compared to $D_{threshold}$ to determine that $D_{temp}$ is greater than $D_{threshold}$.

The method 300, at block B306, includes adjusting a first thermal offset value corresponding to at least the thermal sensor to a second thermal offset value based at least in part on the temperature being greater than the threshold difference. For example, a current (e.g., symmetric) offset value may be adjusted—e.g., incrementally—to an updated (e.g., asymmetric) offset value based at least in part on $D_{temp}$ being greater than $D_{threshold}$. In some embodiments, additional factors may be weighed prior to adjusting the offset value, such as voltage, power, voltage to frequency ratio, etc. Further, the offset value may be changed for one or more of the thermal sensors 104 universally, for individual thermal sensors 104 and not others, and/or in another manner.

Now referring to FIG. 4, FIG. 4 is a flow diagram showing a method 400 of thermal offset management of ICs, in accordance with some embodiments of the present disclosure. The method 400, at block B402, includes determining an average temperature of a set of thermal sensors. For example, with respect to the SoC 110A of FIG. 2A, the average temperature of the thermal sensors 104A-104D may be computed.

The method 400, at block B404, includes determining a temperature of a subset of the set of the thermal sensors. For example, a temperature of the thermal sensor 104A may be determined.

The method 400, at block B406, includes computing $D_{temp}$ between the temperature and the average temperature. For example, the difference between the average temperature of the thermal sensors 104A-104D and a temperature of the thermal sensor 104A, $D_{temp}$, may be computed.

The method 400, at block B408, includes determining whether $D_{temp}$ is greater than $D_{threshold}$. If it is not, then the method 400 may proceed to block B410 to increment a thermal offset from a current value toward a symmetric offset value. For example, where the current value does not correspond to the symmetric offset value—or other desired offset value—the offset value may be incremented toward the desired offset value. Where the current value does correspond to the symmetric offset value, no adjustments may be made.

At block B408, if $D_{temp}$ is greater than $D_{threshold}$, the method 400 may proceed to block B412 to determine whether voltage, frequency, and/or power criteria are satisfied. For example, if the current voltage, frequency, voltage to frequency ratio, and/or power information of a unit and/or partition of the SoC 110A corresponding to at least the thermal sensor 104A do not satisfy certain criteria (e.g., voltage thresholds, power thresholds, voltage to frequency ratio thresholds, etc.), the method 400 may continue to block B410, as described above.

At block B412, if the voltage, frequency, and/or power criteria are satisfied, the method 400 may continue to block B414 to increment a thermal offset from a current value toward an asymmetric offset value. For example, where the current value does not correspond to the asymmetric offset value—or other desired offset value—the offset value may be incremented toward the desired offset value. Where the current value does correspond to the asymmetric offset value, no adjustments may be made.

This method 400 may be repeated at each time step, or at a frequency, such that the desired offset values may be dynamically set and/or the offset values may be incrementally adjusted toward the desired offset values.

Example Computing Device

Figure 5:
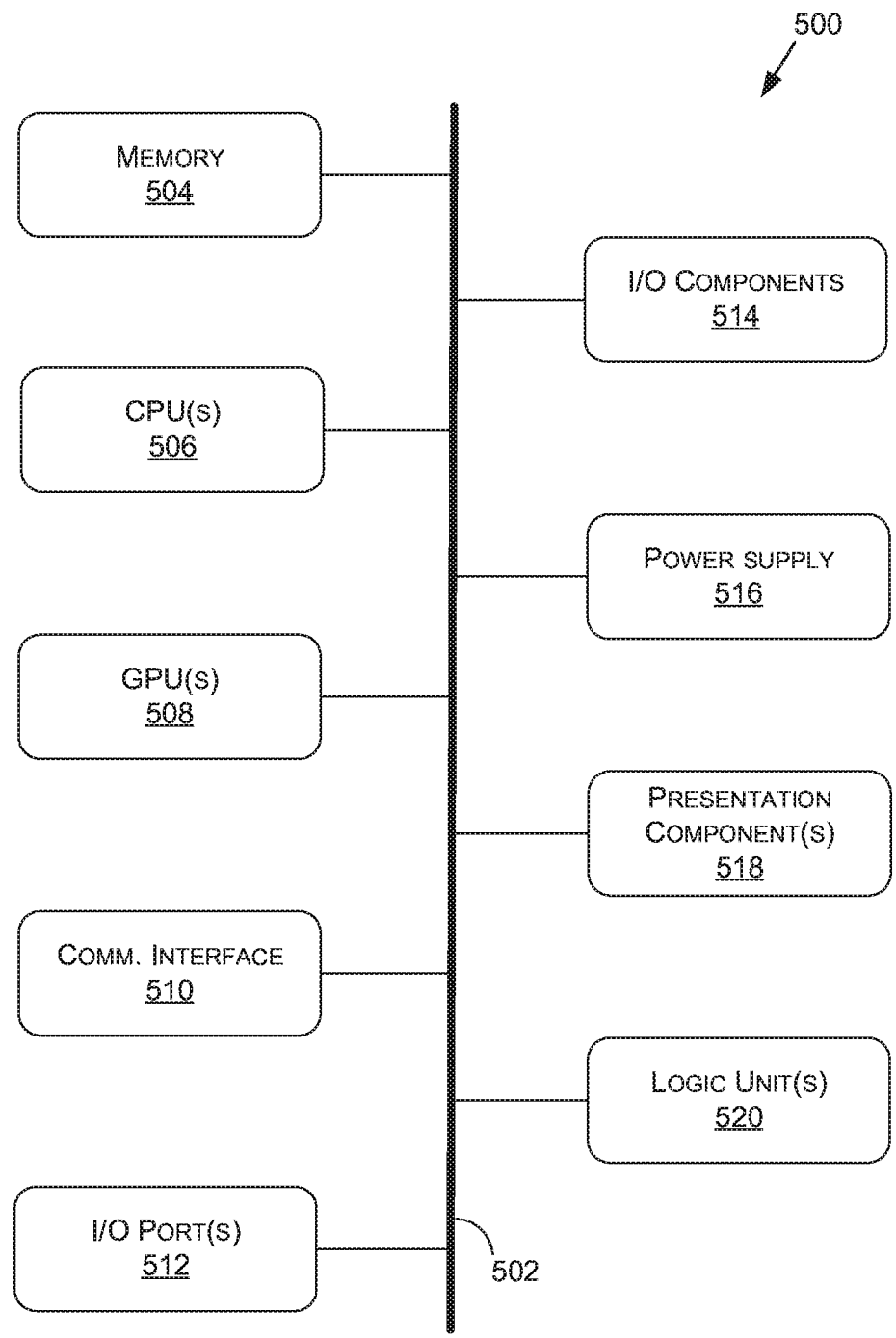
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (IO) ports 512, input/output components 514, a power supply 516, one or more presentation components 518 (e.g., display(s)), and one or more logic units 520.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   computing an average temperature from outputs of a plurality of thermal sensors of an integrated circuit;
   determining a temperature difference between the average temperature and a temperature from an output of a thermal sensor of the plurality of thermal sensors;
   determining that the temperature difference is greater than a threshold value; and
   adjusting a first thermal offset value corresponding to at least the thermal sensor to a second thermal offset value based at least in part on the temperature difference being greater than the threshold value.

2. The method of claim 1, wherein the adjusting the first thermal offset to the second thermal offset value is executed incrementally over a plurality of time steps where temperature differences corresponding to at least one of the thermal sensor or another thermal sensor of the plurality of thermal sensors are greater than the threshold value.

3. The method of claim 1, further comprising:
   computing an updated average temperature from additional outputs of the plurality of thermals sensors;
   determining that temperature differences from the additional outputs when compared to average temperatures of the plurality of thermal sensors are each less than the threshold value; and
   adjusting the second thermal offset value to the first thermal offset value based at least in part on the temperature differences being less than the threshold value.

4. The method of claim 1, wherein the second thermal offset value is greater than the first thermal offset value.

5. The method of claim 1, wherein the first thermal offset value and the second thermal offset value are used, at least in part, to determine final temperature values corresponding to one or more regions of the IC, and the final temperature values are compared against one or more temperature thresholds corresponding to at least one of throttling back power supplied to the IC, turning off power supplied to the IC, or increasing cooling for the IC.

6. The method of claim 1, further comprising:
   determining a ratio between a current voltage supply of the IC to a maximum voltage supply of the IC; and
   determining that the ratio is above another threshold value, wherein the adjusting the first thermal offset value to the second thermal offset value is further based at least in part on the ratio being above the another threshold value.

7. The method of claim 1, further comprising:
determining a voltage to frequency ratio of at least a portion of the IC monitored by the temperature sensor; and
determining that the voltage to frequency ratio is above another threshold value,
wherein the adjusting the first thermal offset value to the second thermal offset value is further based at least in part on the voltage to frequency ratio being above the another threshold value.

8. The method of claim 1, wherein the adjusting the first thermal offset value to the second thermal offset value is for each of the plurality of thermal sensors.

9. The method of claim 1, wherein the adjusting the first thermal offset value to the second thermal offset value is for only the thermal sensor, and thermal sensors of the plurality of thermal sensors other than the thermal sensor have at least one of no adjustment to a respective thermal offset value or an individual adjustment to the thermal offset value separate from the adjusting the first thermal offset value to the second thermal offset value.

10. The method of claim 1, wherein values corresponding to the first thermal offset value and the second thermal offset are set during startup or initialization based at least in part on secure boot software.

11. The method of claim 1, wherein the IC corresponds to at least one of graphics processing unit (GPU), a central processing unit (CPU), a system on a chip (SOC), a sound chip, a network interface chip, a memory IC, a monolithic IC, a hybrid IC, a multi-chip IC, a digital IC, an analog IC, a mixed signal IC, a logic IC, an audio amplifier, an operational amplifier, a timer IC, a power management IC, an interface IC, or a combination thereof.

12. The method of claim 1, wherein values corresponding to the first thermal offset value and the second thermal offset value are determined using at least one of thermal simulations of a virtual representation of the IC or thermal observations of the IC.

13. A method comprising:
computing, at each time step, an average temperature from outputs of a plurality of thermal sensors of an integrated circuit;
computing, at each time step, a difference between the average temperature and a temperature corresponding to a thermal sensor of the plurality of thermal sensors;
determining, at each time step, whether the difference is greater than a threshold value; and
dynamically adjusting a thermal offset value of one or more of the plurality of thermal sensors to a first thermal offset value at a first subset of time steps where the difference is greater than the threshold value and to a second thermal value at a second subset of time steps where the difference is less than the threshold value.

14. The method of claim 13, wherein the first thermal offset value is greater than the second thermal offset value.

15. The method of claim 13, wherein the dynamically adjusting the thermal offset value is incremental from the thermal offset value toward one of the first thermal offset value or the second thermal offset value until the one of the first thermal offset value or the second thermal offset value are reached.

16. The method of claim 13, wherein thermal offset values are different for each of a first thermal sensor of the plurality of thermal sensors and a second thermal sensor of the plurality of thermal sensors.

17. The method of claim 13, wherein the dynamically adjusting the thermal offset value is applied universally to each of the plurality of thermal sensors.

18. The method of claim 13, wherein, at each time step, the dynamically adjusting the thermal offset is further based on at least one of a first ratio between current voltage supply to maximum voltage supply or a second ratio between voltage to frequency.

19. A system comprising:
an integrated circuit including a first thermal sensor and a second thermal sensor;
one or more processors; and
one or more memory devices storing instructions that, when executed by the one or more processors, cause the one or more processors to execute operations comprising:
computing an average temperature between a first output of the first thermal sensor and a second output of the second thermal sensor;
computing a difference between the average temperature and a temperature from the first output;
determining that the difference is greater than a threshold value; and
adjusting a first thermal offset value corresponding to the first thermal sensor to a second thermal offset value based at least in part on the difference being greater than the threshold value.

20. The system of claim 19, wherein the adjusting the first thermal offset value to the second value is executed incrementally over each consecutive time step where the difference is greater than the threshold value.

* * * * *